US009180365B2

(12) United States Patent
Torre et al.

(10) Patent No.: US 9,180,365 B2
(45) Date of Patent: Nov. 10, 2015

(54) POLYMORPHIC FIREARM CONTROLLER

(75) Inventors: David P. Torre, El Granada, CA (US);
Roy Dimalanta, Danville, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 0 days.

(21) Appl. No.: 13/012,764

(22) Filed: Jan. 24, 2011

(65) Prior Publication Data

US 2011/0275435 A1 Nov. 10, 2011

Related U.S. Application Data

(60) Provisional application No. 61/333,193, filed on May 10, 2010.

(51) Int. Cl.
| A63F 13/06 | (2006.01) |
| A63F 13/10 | (2006.01) |
| A63F 13/20 | (2014.01) |
| A63F 13/98 | (2014.01) |

(52) U.S. Cl.
CPC ............... *A63F 13/06* (2013.01); *A63F 13/02* (2013.01); *A63F 2300/10* (2013.01); *A63F 2300/1043* (2013.01); *A63F 2300/8076* (2013.01)

(58) Field of Classification Search
CPC ................ A63F 2300/8076; A63F 2300/80; A63F 2300/6045; A63F 2300/681; A63F 2300/6063; A63F 2300/301; A63F 2300/302; A63F 2300/303; A63F 2300/307; A63F 2300/1012; A63F 2300/1037; A63F 2300/1043; A63F 23/1018; A63F 2009/247; A63F 2300/105; A63F 2009/2477; A63F 2009/2447; A63F 2009/248; A63F 2009/2482; A63F 2009/2402; A63F 2300/1062
USPC ......... 463/5, 7, 36–42, 47, 49–57, 11–13, 16, 463/17–19, 20, 25, 26–28, 30, 31; 434/11–24
See application file for complete search history.

(56) References Cited

U.S. PATENT DOCUMENTS

| 2,391,423 | A | * | 12/1945 | Jenkinson | 42/6 |
| 4,057,003 | A | * | 11/1977 | Atchisson | 89/138 |
| 4,841,657 | A | * | 6/1989 | Mossberg | 42/76.01 |
| 6,342,010 | B1 | * | 1/2002 | Slifer | 463/39 |

(Continued)

OTHER PUBLICATIONS

International Search Report and Written Opinion for PCT Application No. PCT/US2011/022614 mailed Mar. 25, 2011, 18 pages.

(Continued)

*Primary Examiner* — David L Lewis
*Assistant Examiner* — Matthew D Hoel
(74) *Attorney, Agent, or Firm* — Blakely Sokoloff Taylor & Zafman LLP

(57) ABSTRACT

A game controller includes a first mock firearm action associated with a first weapon mode and a second mock firearm action associated with a second weapon mode. If first mock firearm action is enabled, it can generate a load command when the first mock firearm action is operated. If second mock firearm action is enabled, it can generate a load command when the second mock firearm action is operated. The game controller includes a mode selector, to enable the first mock firearm action when the game controller is in the first weapon mode and to enable the second mock firearm action when the game controller is in the second weapon mode.

18 Claims, 14 Drawing Sheets

(56) References Cited

U.S. PATENT DOCUMENTS

| | | | |
|---|---|---|---|
| 6,379,249 B1* | 4/2002 | Satsukawa et al. | 463/31 |
| 6,579,097 B1* | 6/2003 | Sampson et al. | 434/21 |
| 6,672,962 B1 | 1/2004 | Ozaki et al. | |
| 6,902,483 B2* | 6/2005 | Lin | 463/37 |
| RE39,818 E * | 9/2007 | Slifer | 463/39 |
| 7,510,477 B2* | 3/2009 | Argentar | 463/36 |
| 7,896,733 B2* | 3/2011 | Tanabe | 463/7 |
| 2003/0199317 A1 | 10/2003 | McCauley | |
| 2004/0009798 A1 | 1/2004 | Okuda et al. | |
| 2005/0130739 A1 | 6/2005 | Argentar | |
| 2005/0197178 A1* | 9/2005 | Villegas | 463/5 |
| 2008/0064500 A1* | 3/2008 | Satsukawa et al. | 463/37 |
| 2009/0181737 A1* | 7/2009 | Argentar | 463/2 |
| 2009/0197679 A1* | 8/2009 | Argentar | 463/36 |
| 2010/0056277 A1* | 3/2010 | Marks et al. | 463/36 |
| 2010/0093436 A1* | 4/2010 | Lander | 463/37 |
| 2010/0178967 A1* | 7/2010 | Cheng et al. | 463/5 |
| 2011/0092290 A1* | 4/2011 | Huebner et al. | 463/39 |

OTHER PUBLICATIONS

*International Preliminary Report on Patentability for International Patent Application* No. PCT/US2011/022614 Mailed Nov. 22, 2012.

* cited by examiner

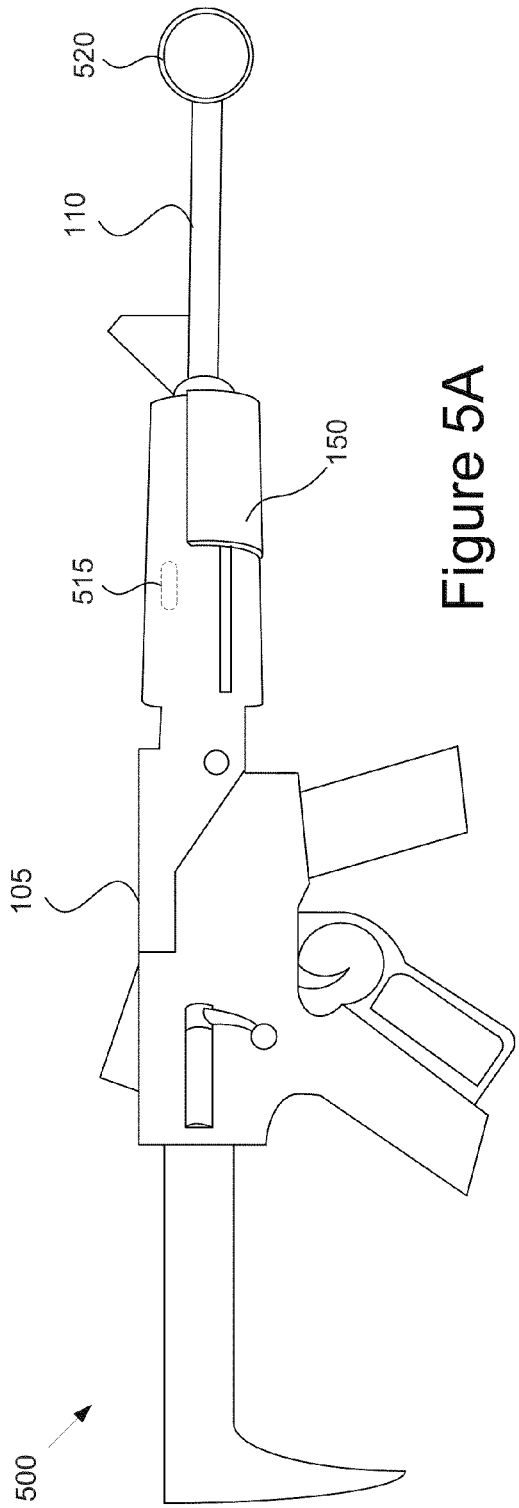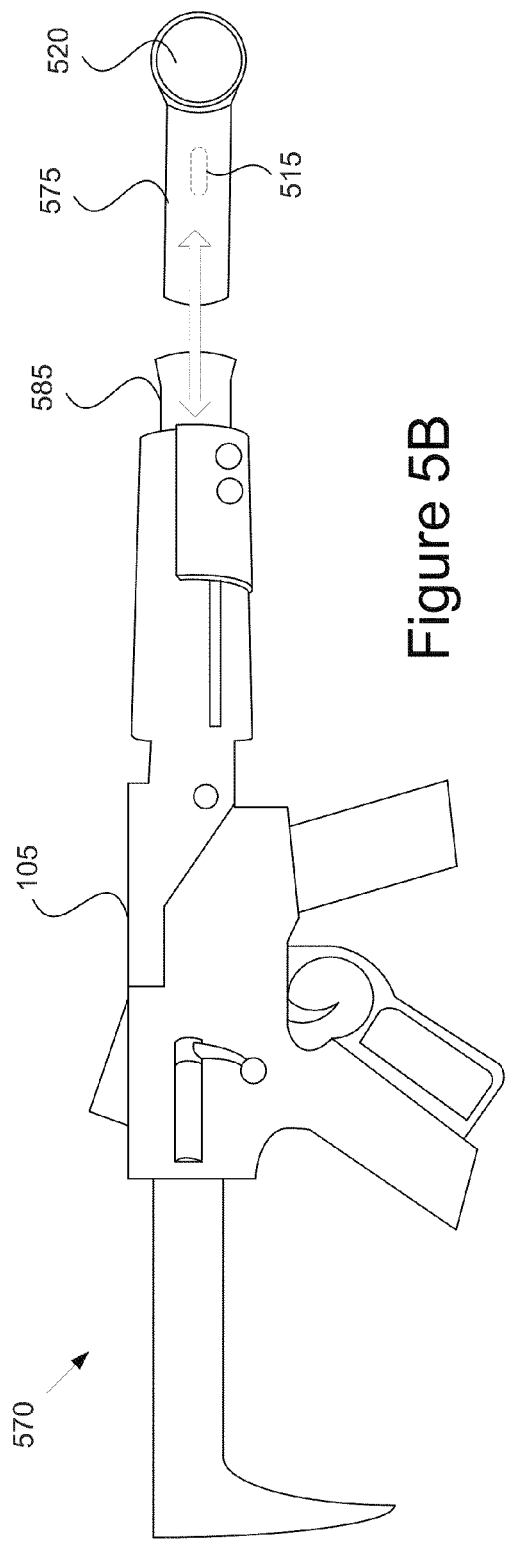
Figure 5A
Figure 5B

POLYMORPHIC FIREARM CONTROLLER

RELATED APPLICATIONS

This patent application claims the benefit under 35 U.S.C. §119(e) of U.S. Provisional Application No. 61/333,193, filed May 10, 2010, which is herein incorporated by reference.

FIELD OF THE INVENTION

The present invention relates generally to game controllers, such as those used with game consoles, and more particularly to a game controller that can simulate multiple different types of firearms.

DESCRIPTION OF THE RELATED ART

A growing trend in the computer gaming industry is to develop games that provide increased realism, graphics and audio. Additionally, as game consoles and computer games become more sophisticated, the level of interaction between players and the game is increased. However, in shooting games such as first person shooting games, the physical input mechanism for aiming and shooting remains clumsy and artificial. For the most part, users use standard game controllers that include a directional pad (D-pad) and multiple buttons for controlling a character, aiming and shooting. Those gun controllers that are available are primitive, and typically provide little more than an ability to aim and a trigger to shoot. Firearm controllers presently do not include mock firearm actions that mimic firearm actions of real weapons. Nor do current firearm controllers include a scope function that is integrated with shooting games, or a recoil mechanism to simulate the recoil of a real firearm.

BRIEF DESCRIPTION OF THE DRAWINGS

The invention may best be understood by reference to the following description taken in conjunction with the accompanying drawings in which:

FIG. 5A illustrates a firearm controller having a ball section and game controls, in accordance with one embodiment of the present invention;

FIG. 5B illustrates a firearm controller having a dock for attaching an additional game controller, in accordance with one embodiment of the present invention;

DETAILED DESCRIPTION

Described herein is a firearm controller for use with a computing device such as a game console. In one embodiment, a firearm controller includes multiple mock firearm actions. For example, the firearm controller may include a mock pump action, a mock bolt action and a mock automatic action. The firearm further includes a mode selector that activates particular weapon modes, each of which may be associated with one or more of the mock firearm actions. When a user manipulates one of the mock firearm actions, if the weapon mode associated with that mock firearm action is enabled, the firearm controller sends a load ammunition signal to a game. In one embodiment, the firearm controller also includes a scope and a recoil simulator for simulating the recoil of a real firearm.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
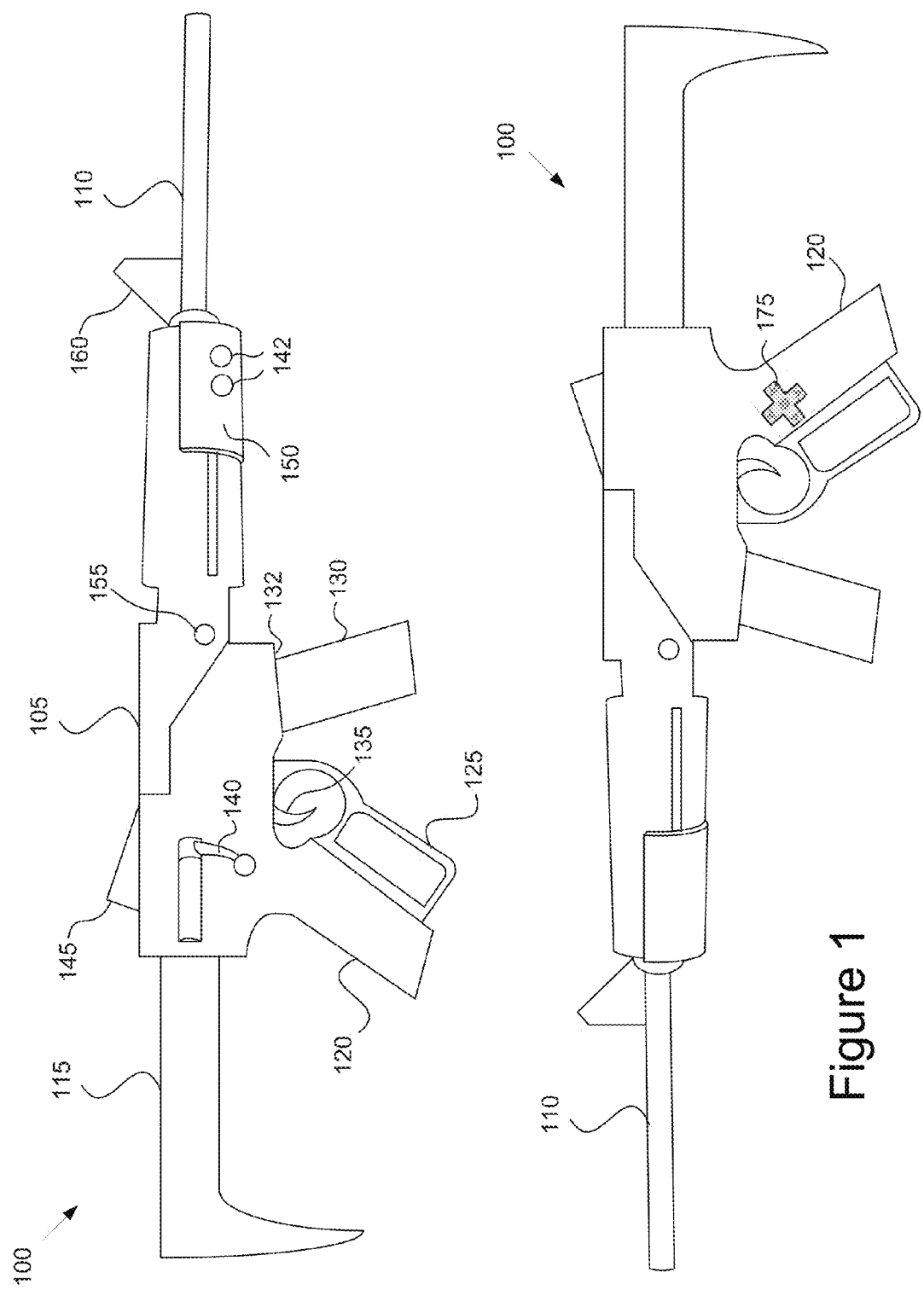
FIG. 1 illustrates multiple views of a firearm controller, in accordance with one embodiment of the present invention.

FIG. 1 illustrates opposite side views of a firearm controller 100, in accordance with one embodiment of the present invention. The firearm controller 100 has a main body 105, which may include a gun barrel 110, gunstock 115 and grip 120. The main body 105 may also include a rear open sight 145 and a forward open sight 160. In one embodiment, one or more of the gunstock 115, gun barrel 110, rear open sight 145 and forward open sight 160 are attachable components that can be attached and removed from main body 105 of the firearm controller 100.

The firearm controller 100 includes a trigger 135 attached to the main body. The firearm controller 100 includes a mechanical switch, electrical switch and/or sensor that detects when the trigger 135 is pulled. When the trigger 135 is pulled, a signal is generated, which is transmitted (via a wireless or wired connection) to a computing device such as a game console. A fire command may then be generated in an active game in the computing device.

The firearm controller 100 includes one or more mock firearm actions 155, 125, 150, 140, 132. A firearm action is a physical mechanism that manipulates cartridges and/or seals a breech of a firearm, thus loading or reloading the firearm. A mock firearm action is a physical mechanism that can be manipulated with the same motions that would be required to work a real firearm action. For example, to reload a firearm having a pump action, a user pumps a forward handgrip back and forth to eject a spent round of ammunition and chamber a new round. A mock pump action 150 includes a mechanism that enables a forward handgrip to be pumped back and forth in the same manner as with a real pump action. However, the mock pump action 150 does not actually eject a spent round of ammunition or chamber a new round by this pumping action.

Each of the mock firearm actions 155, 125, 150, 140, 132 can be manipulated/operated in a manner that is similar to the manner to a corresponding real firearm action, as described in the above example. In one embodiment, the firearm controller 100 includes a mock lever action 125, a mock pump action 150, a mock break action 155 and a mock bolt action 140. The firearm controller 100 may also include a mock automatic/semi-automatic action 132, having a magazine holder which receives a mock ammunition magazine 130.

Each of the mock firearm actions 155, 125, 150, 140, 132 may include one or more mechanical switches, electrical switches and/or other sensors (e.g., conductive sensors, inductive sensors, infrared sensors, resistive sensors, etc.) that detect when that mock firearm action is manipulated. The switches/sensors may be operated based on pressure, force, electrical contact, or other mechanisms. In one embodiment, one or more mock firearm actions include a single switch/sensor that detects whether or not the mock firearm action is in a resting position. When the mock firearm action is removed from the resting position and then placed back in the resting position (e.g., when the pump action is pumped back and then forth), a signal may be generated and sent to a computing device. The computing device may then perform a load ammunition action in an active game.

In another embodiment, one or more mock firearm actions include a single switch/sensor that detects when the mock firearm action is in a fully actuated position. A signal for a load ammunition command may be generated and transmitted when the mock firearm action is detected in the fully actuated position.

In another embodiment, one or more mock firearm actions include two or more switches/sensors. For example, a mock firearm action may include a first switch/sensor that detects when the mock firearm action is in a resting position and a second switch/sensor that detects when the mock firearm action is in a fully actuated position. In such an embodiment, a load ammunition signal may be generated when the mock firearm action is manipulated from the resting position (detected by first switch/sensor) to the fully actuated position (detected by second switch/sensor) and back to the resting position (detected again by the first switch/sensor).

In addition to a trigger 135 and mock firearm actions 155, 125, 150, 140, 132, the firearm controller 100 may also include one or more conventional game controller inputs, such as a directional pad (D-pad) 175 and buttons 142. In one embodiment, the firearm controller 100 includes one or more buttons 142 on a forward handgrip/mock pump action 150. These buttons 142 may correspond, for example, to the A and B buttons of a standard Sony® Playstation® controller or Nintendo® Wii® controller. Buttons may also be placed at other locations of the firearm controller 100, such as on the grip 120 or other locations of the main body 105. In one embodiment, the firearm controller 100 includes a D-pad 175 on the grip 120. The D-pad 175 may be positioned on the grip 120 so that the thumb of a right-handed user is positioned over the D-pad 175 when holding the firearm controller 100. Alternatively, the D-pad 175 may be placed elsewhere on the firearm controller 100, such as on the forward grip/pump action 150.

Figure 2A:
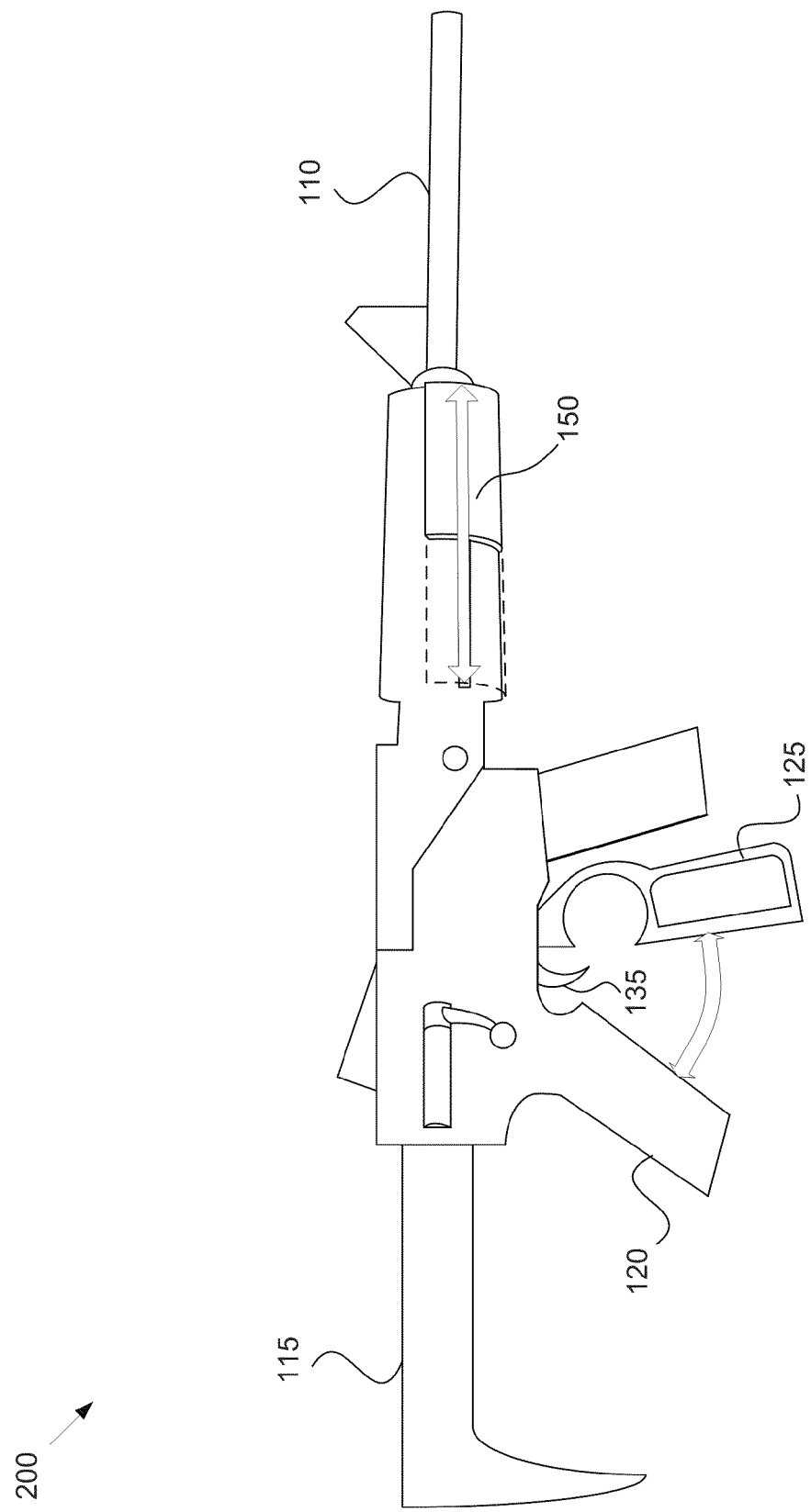
FIG. 2A illustrates a demonstration of a mock pump action and a mock lever action for the firearm controller of FIG. 1, in accordance with one embodiment of the present invention.

FIG. 2A illustrates a demonstration of a mock pump action 150 and a mock lever action 125 for a firearm controller 200, in accordance with one embodiment of the present invention. In one embodiment, firearm controller 200 corresponds to firearm controller 100 of FIG. 1.

A lever action is a type of firearm action that uses a lever located around a trigger guard area. Weapons having lever actions include rifles and shotguns built in the late 1800s. The mock lever action 125 can be manipulated by rotating a lever about an axis positioned near the trigger 135. As shown, the mock lever action 125 may have a resting position in which the lever rests against the grip 120, and a fully actuated position in which the lever is pivoted away from the grip 120.

As described above, the pump action is a type of firearm action that uses a pump, which is pumped back and forth. Typical firearms having pump actions include shotguns, air guns, rifles (typically called a slide action when used in rifles) and grenade launchers. The mock pump action 150 includes a forward hand grip that can be pumped back (toward the gunstock 115) and forward (toward the gun barrel 110). The mock pump action 150 may be manipulated/operated by performing the pumping action.

Figure 2B:
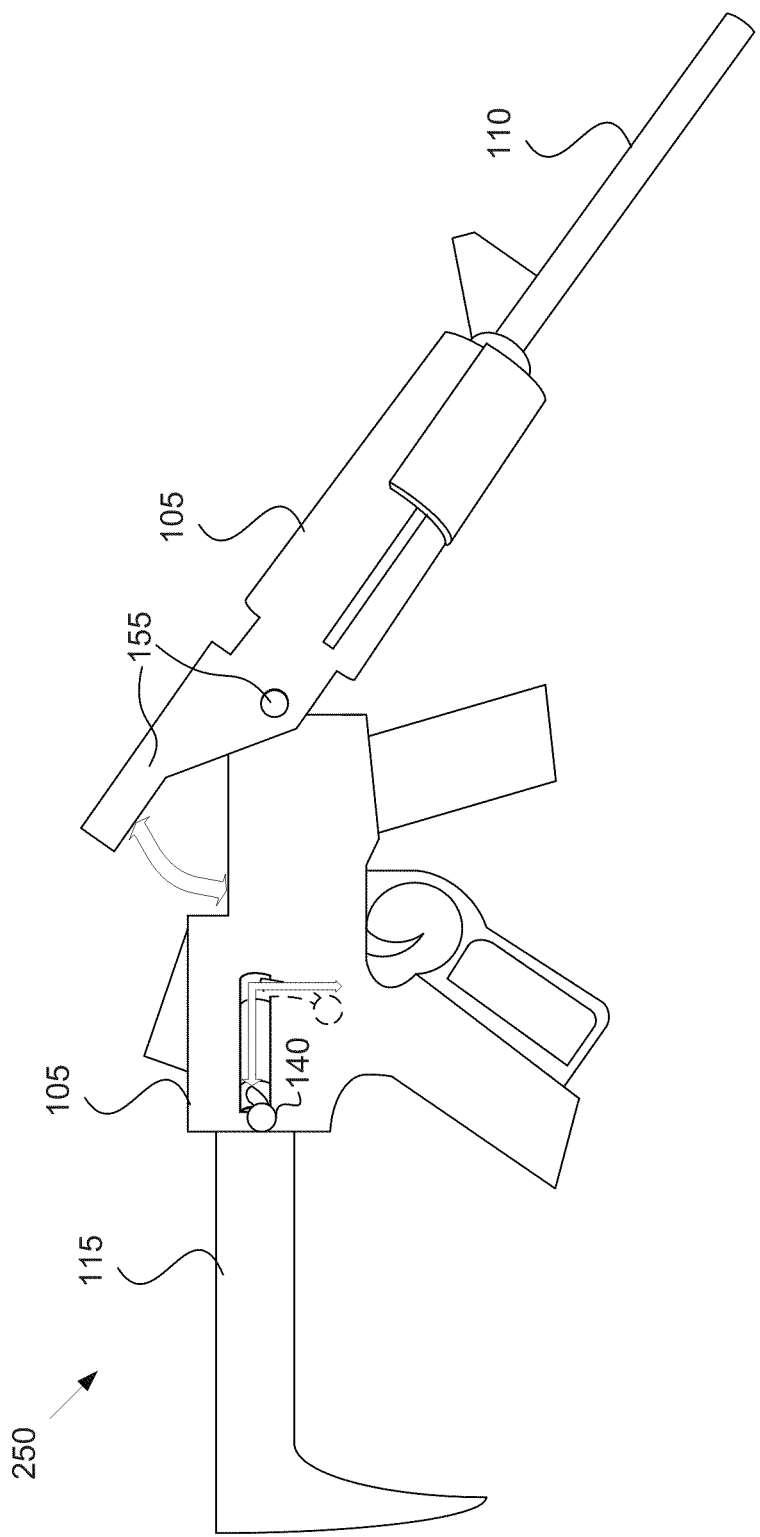
FIG. 2B illustrates a demonstration of a mock break action and a mock bolt action for the firearm controller of FIG. 1, in accordance with one embodiment of the present invention.

FIG. 2B illustrates a demonstration of a mock break action 155 and a mock bolt action 140 for a firearm controller 250, in accordance with one embodiment of the present invention. In one embodiment, firearm controller 250 corresponds to firearm controller 100 of FIG. 1.

A break action includes a hinged barrel that rotates perpendicular to a bore axis of a firearm to expose the firearm's breech and allow loading and unloading of ammunition. A well known firearm having a break action is a double barreled shotgun. The mock break action 155 includes a pivot that enables the gun barrel to rotate forward perpendicular to a bore axis as shown.

A bolt action is a firearm action in which a bolt (the mechanical part of a firearm that blocks the rear of the chamber while propellant burns) is operated manually by opening and closing the breech with a small handle. Most bolt action firearms are rifles (such as sniper rifles). The mock bolt action 140 is manipulated/operated by lifting a handle and pulling it towards the gunstock 115, then returning the handle to its original resting position, as shown. This mimics the operations of unlocking the bolt, opening the breech, withdrawing and ejecting a spent shell casing, cocking a firing pin, placing a new round in the breech and closing the bolt, none of which are actually performed in one embodiment.

Figure 3:
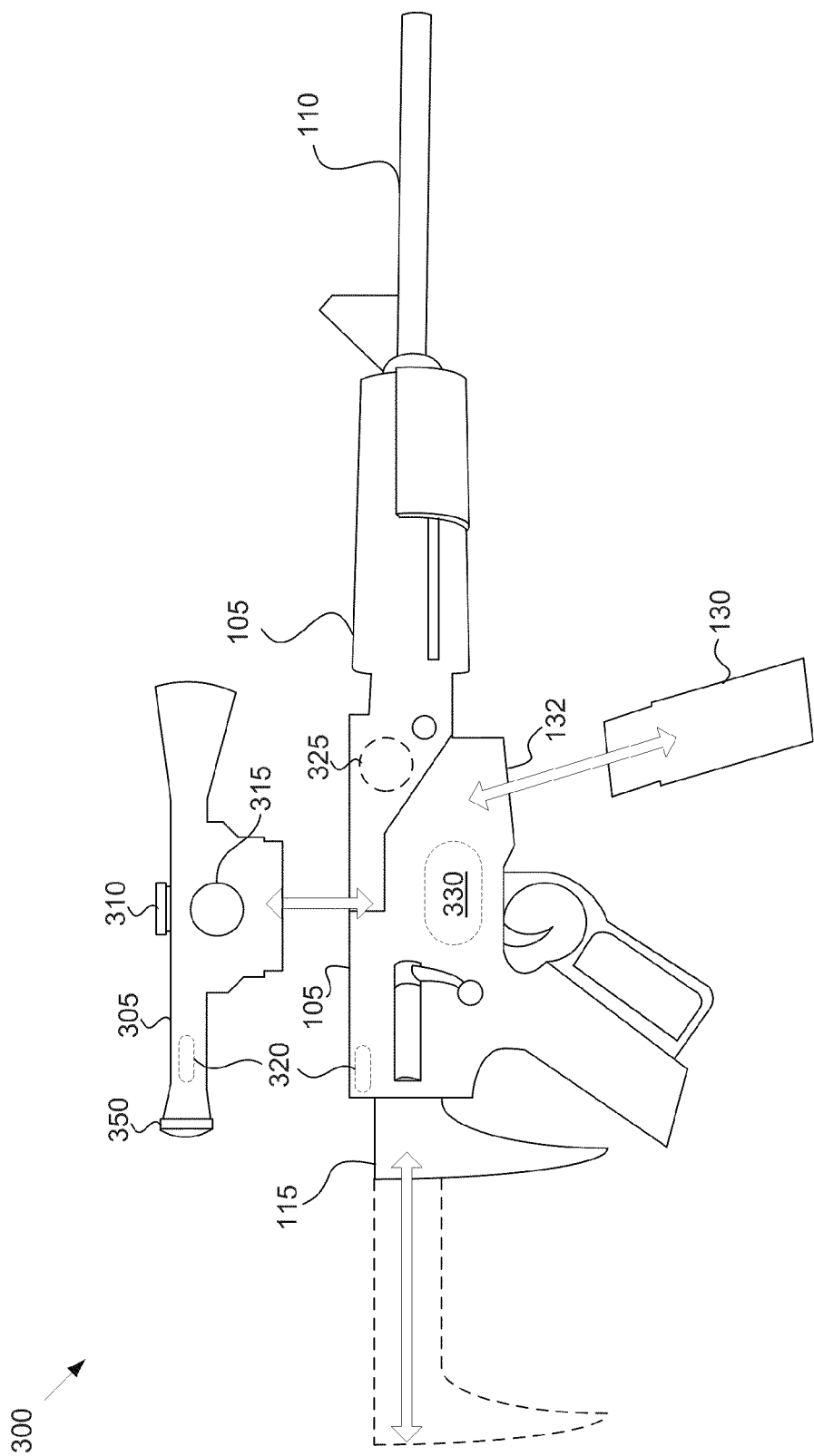
FIG. 3 illustrates multiple functions and accessories for the firearm controller of FIG. 1, in accordance with one embodiment of the present invention.

FIG. 3 illustrates multiple functions and accessories for a firearm controller 300, in accordance with one embodiment of the present invention. In one embodiment, firearm controller 300 corresponds to firearm controller 100 of FIG. 1. In one embodiment, firearm controller 300 includes an adjustable gunstock 115. The adjustable gunstock 115 can be retracted or extended to suit a user. The gunstock 115 may be extended to a length appropriate to a firearm that is being used in a shooting game. For example, if a rifle is being used in the shooting game, the gunstock 115 may be fully extended, and if a pistol or submachine gun is being used in the shooting game, the gunstock 115 may be fully retracted. In one embodiment, the main body 105 and/or gunstock 115 include multiple stops, each of which corresponds to a gunstock length of a particular class of firearm. In one embodiment, the gunstock 115 is motorized. This enables the gunstock to automatically change length to correspond to a gunstock length appropriate to a currently selected firearm in a game. For example, when a user switches from a pistol to a rifle in a game, the gunstock may automatically extend from a fully retracted to a fully extended position.

In one embodiment, the firearm controller 300 includes a mock automatic/semi-automatic firearm action 132. The mock automatic/semi-automatic action 132 may include a magazine holder for inserting a mock ammunition magazine 130. In one embodiment, manipulating/operating the mock automatic/semi-automatic action 132 includes removing the mock ammunition magazine 130 from the magazine holder, and reinserting the mock ammunition magazine 130 or a different mock ammunition magazine into the magazine holder. This may cause a load ammunition signal to be generated and sent to a computing device (e.g., to a game console).

In one embodiment, there are two mock ammunition magazines 130, and firearm controller 300 includes an ability to differentiate between the two mock ammunition magazines 130. For example, the two ammunition magazines 130 may each include a different RFID transponder having a different identifier, and the firearm controller 300 may include an RFID reader. Alternatively, each of the mock ammunition magazines 130 may have a slightly different shape and/or configuration, and may cause a different switch to be closed when inserted into the mock automatic/semi-automatic action, enabling the firearm controller 100 to differentiate between the two mock ammunition magazines. In one embodiment, a load signal is generated when a first mock ammunition magazine is removed and a second mock ammunition magazine is inserted, however a load signal is not generated when the same mock ammunition is removed and then reinserted. This can increase realism of a magazine running out of ammunition.

In one embodiment, the firearm controller 100 includes one or more sensors 320, which may be physical contact sensors (e.g., contact switches, touch sensors, etc.) or proximity sensors. In one embodiment, the sensors 320 are touch switches that register contact between the gunstock or back of the main body and a user's chin. In one embodiment, the sensors 320 are capacitive sensors such as those that detect the presence of capacitive objects using capacitive relaxation oscillation, a current verses voltage phase shift comparison, resistor-capacitor charge timing, capacitive bridge division, charge transfer, sigma-delta modulation, or charge-accumulation. In another embodiment, sensors 320 are inductive sensors, which include an inductive loop that detects the presence of an inductive object. In an alternative embodiment, the sensors 320 are optical (e.g., infrared) sensors that use an emitter and receiver pair to detect the presence of opaque objects. For example, an optical sensor may measure the distance between the base of the gunstock and a users cheek bone. The sensors 320 may also be ultrasonic sensors that emit an ultrasonic signal and measure a time duration between when a signal is transmitted and the reflection of that signal received (a.k.a., flight response). The sensors 320 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used.

The sensors 320 may be positioned on the main body 105, gunstock 115 and/or a scope 305 to detect when a user is holding the firearm controller 300 close to his face (e.g., to detect the user's face). For example, the sensors 320 may be used to detect when a user is looking through scope 305, or holding the firearm controller 300 as though he were looking through a scope (even if there is no scope actually attached to the firearm controller 300). When the sensors 320 detect the presence of a user's face (or otherwise detect that the user is holding the firearm controller 300 as though peering through a scope), a zoom signal is generated and sent to a computing device. This may cause an active game to zoom in on a currently displayed scene as though the player was looking through a real weapon scope. This may also cause additional scope-like features, such as a red dot or sniper reticle depending on an active weapon mode (described below).

In one embodiment, a scope 305 can be attached to the main body 305 of the firearm controller 300, as shown. The scope 305 may include the sensors 320 as discussed above. In one embodiment, the scope 305 includes one or more adjustment controls, as found on real weapon scopes. For example, the scope 305 may include a dial 350 for adjusting zoom and/or focus. The scope 305 may also include a horizontal adjustment control 315 for adjusting the scope for windage (wind direction and strength) in a game and an elevation adjustment control 310 for adjusting for target distance in the game. Each of these controls 310, 215, 350 may be dials that causes signals for increasing or decreasing one or more scope parameters to be generated as the dial is rotated. These signals may be sent to a computing device and applied to an active game to affect weapon accuracy, focus, zoom settings, etc.

In one embodiment, firearm controller 300 includes a recoil simulator 330. The recoil simulator 330 generates force feedback when a user fires a firearm in a game (e.g., when the trigger is pulled). In one embodiment, the recoil simulator 330 causes a vibration feedback to simulate recoil. For example, the recoil simulator 330 may include Sony's DualShock® vibration system. In another embodiment, the recoil simulator 330 generates a directed force towards the gunstock 115 and away from the gun barrel 110. Such directed force provides a more realistic firearm recoil simulation than that provided by a vibration system. In one embodiment, the directed force feedback is provided via CO2 cartridges that may be included in the ammunition magazine 130.

In one embodiment, the strength of the force feedback generated by the recoil simulator 330 is variable. For example, if a current weapon being used in a game is a pistol, a small force feedback may be generated. In contrast, if an elephant gun is being used in the game, a large force feedback may be generated. In one embodiment, the recoil simulator 330 can generate a weak force feedback and a strong force feedback (e.g., as is provided by Sony's Dualshock). Alternatively, there may be more than two levels of force feedback strength.

In one embodiment, the recoil simulator 330 can generate different force feedback patterns. For example, if a weapon fires three shot bursts in a game, the recoil simulator 330 may generate three rapid kicks/thrusts toward the gunstock, whereas if a single shot is fired in a game, only a single kick/thrust is generated. In one embodiment, force feedback can be enabled or disabled on the firearm controller 300.

In one embodiment, the firearm controller 300 includes one or more speakers 325. The speakers 325 may be used to generate sounds appropriate to a current action of the firearm controller 300 and appropriate to a current weapon mode. For example, if a current weapon mode is a shotgun mode, then a sound simulating a shotgun blast may be output when the trigger is pulled, and a sound simulating a shotgun pump action reload may be output when the pump action is manipulated.

Figure 4A:
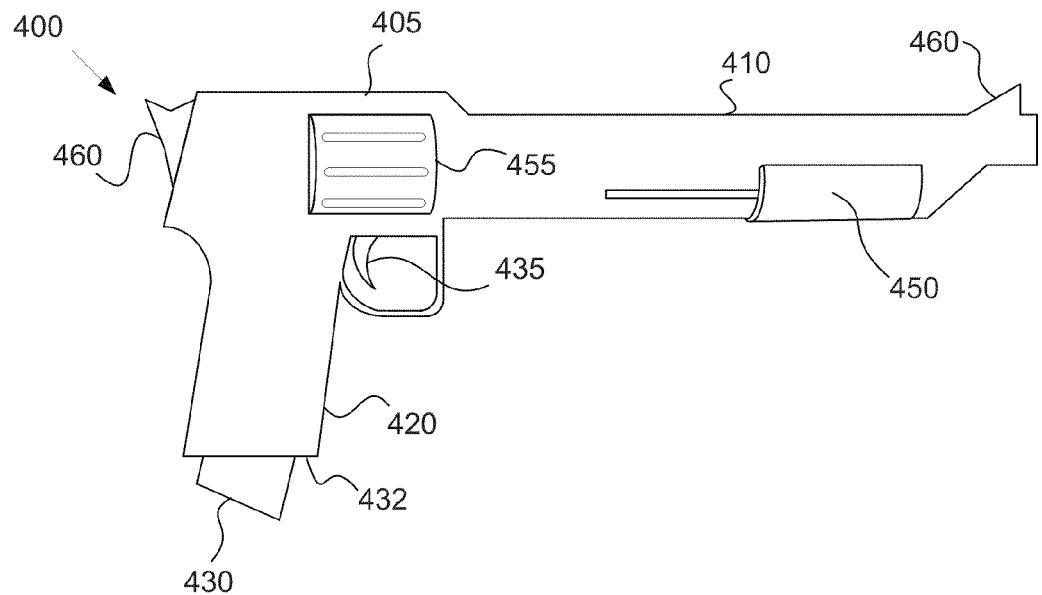
FIG. 4A illustrates a handgun firearm controller, in accordance with one embodiment of the present invention.

FIG. 4A illustrates a handgun firearm controller 400, in accordance with one embodiment of the present invention. The handgun firearm controller 400 may be include some or all of the same features as the previously discussed firearm controllers (e.g., firearm controller 100 of FIG. 1), but may have a smaller form factor. For example, the handgun firearm controller 400 may accept a scope and a gunstock, and may include a D-pad and one or more buttons, even though these features are not shown.

The handgun firearm controller 400 includes a main body 405, a gun barrel 410, a grip 420 and a trigger 435. The handgun firearm controller 400 may also include one or more of the mock firearm actions previously discussed. For example, the handgun firearm controller 400 may include a mock automatic action 432 that accepts a mock ammunition magazine 430 and a mock pump action 450.

The handgun firearm controller 400 may also include a mock revolver action 455. The mock revolver action 455 may include a barrel that can spin (e.g., as the trigger 435 is pulled), or may simply include a barrel that can retract from the main body 405. In one embodiment, the mock revolver action 455 is manipulated by retracting the barrel from the main body 405, and then placing the barrel back into the main body 405. Alternatively, a user may be required to spin the barrel after it is retracted before placing it back in the main body 405 to operate the mock revolver action 455.

In one embodiment, the handgun firearm controller 400 includes a hammer 460. The hammer 460 may be cocked to simulate the hammer of a real handgun.

Figure 4B:
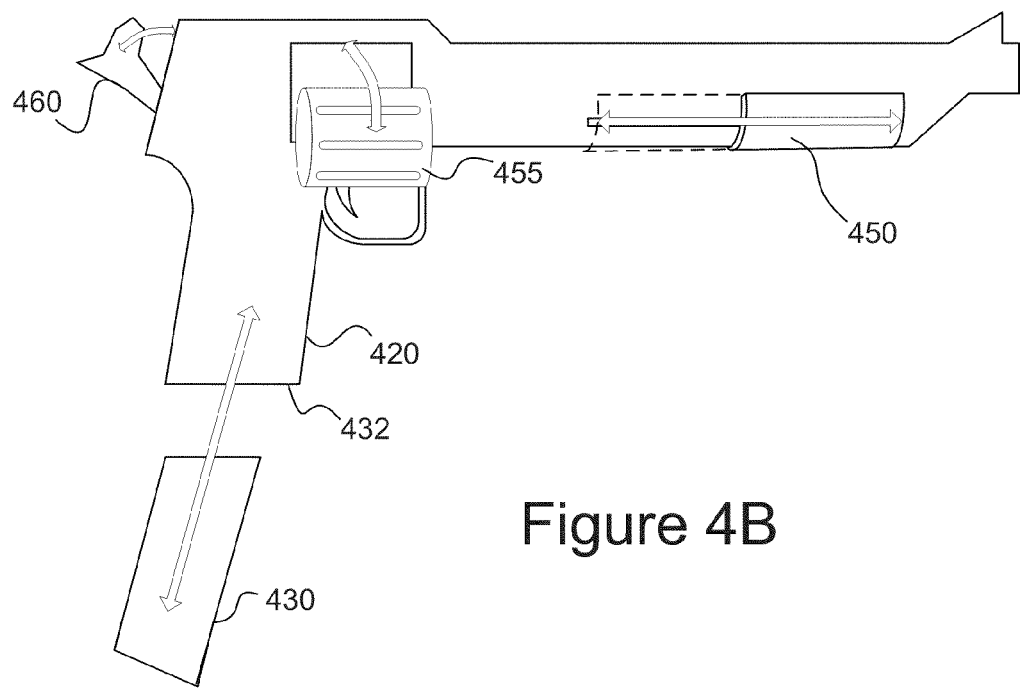
FIG. 4B illustrates multiple functions of the handgun firearm controller of FIG. 4A, in accordance with one embodiment of the present invention.

FIG. 4B illustrates multiple functions of the firearm controller of FIG. 4A, in accordance with one embodiment of the present invention. FIG. 4B illustrates how the hammer 460, mock revolver action 455, mock pump action 450, and mock automatic action 432 may be manipulated/operated (e.g., to generate a load ammunition signal).

FIG. 5A illustrates a firearm controller 500 having a ball section 520 and an inertial sensor 515, in accordance with one embodiment of the present invention. FIG. 5B illustrates a firearm controller 570 having a dock 585 or other interface for attaching an additional game controller 575, in accordance with one embodiment of the present invention. In one embodiment, the additional game controller 575 includes a ball section 520 and an inertial sensor 515. By not having the ball section 520 and inertial sensor 515 built into the firearm controller 570, a cost of the firearm controller 570 may be reduced.

The inertial sensors 515 may include gyroscopes and/or accelerometers, which may have fixed positions within the firearm controller 500 and additional game controller 575. Gyroscopes use principals of angular momentum to detect changes in orientation (e.g., changes in pitch, roll and twist). Accelerometers measure accelerations along one or more axes. The gyroscope and accelerometer may be separate sensors, or may be combined into a single sensor. In one embodiment, the gyroscope and accelerometer are micro-electromechanical systems (MEMS) devices.

The inertial sensors 515 may measure accelerations along a single axis or multiple axes, and may measure linear as well as angular accelerations. The inertial sensors 515 may be used to determine an orientation and/or bearing of the firearm controller 500 or additional game controller 575. When the additional game controller 575 is attached to firearm controller 570, the inertial sensors 515 also identify an orientation and/or bearing of firearm controller 570. In one embodiment, firearm controller 500 and additional game controller 575 further include a magnetometer for determining a bearing. Changes in orientation and/or bearing of the firearm controllers 500, 570 may be used as an input to a computing device (e.g., to control a character in a game). For example, changing an orientation of the firearm controllers 500, 570 can be used to control a character in a first person or third person perspective game.

The ball sections 520 are tracked by a position sensor that is connected with the computing device (e.g., with a game console). The position sensor may be an optical sensor such as a video camera, stereo camera or Z-camera. The ball sections 520 can be of different colors, and in one embodiment, the ball sections 520 can light up. Although a spherical ball section is illustrated, the ball sections 520 can have other shapes for visual tracking purposes, such as a partial sphere, an imperfect sphere, an elongated ball (like one used in American football or in rugby), a cube-like shape, etc. In one embodiment, the ball section 520 is 4 cm. in diameter. However, other larger or smaller sizes are also possible. Larger sizes help with visual recognition. For example, a ball with a 5 cm. diameter can provide about 55 percent more pixels for image recognition than a 4 cm. ball.

The position of the ball sections 520 can be determined by the position sensor, and this position may be used as an input to the computing device (e.g., to control a character in a game). In one embodiment, the position of the ball section 520 is used along with the orientation and/or bearing of the firearm controller 500, 570 to control a character in a game.

Figure 6:
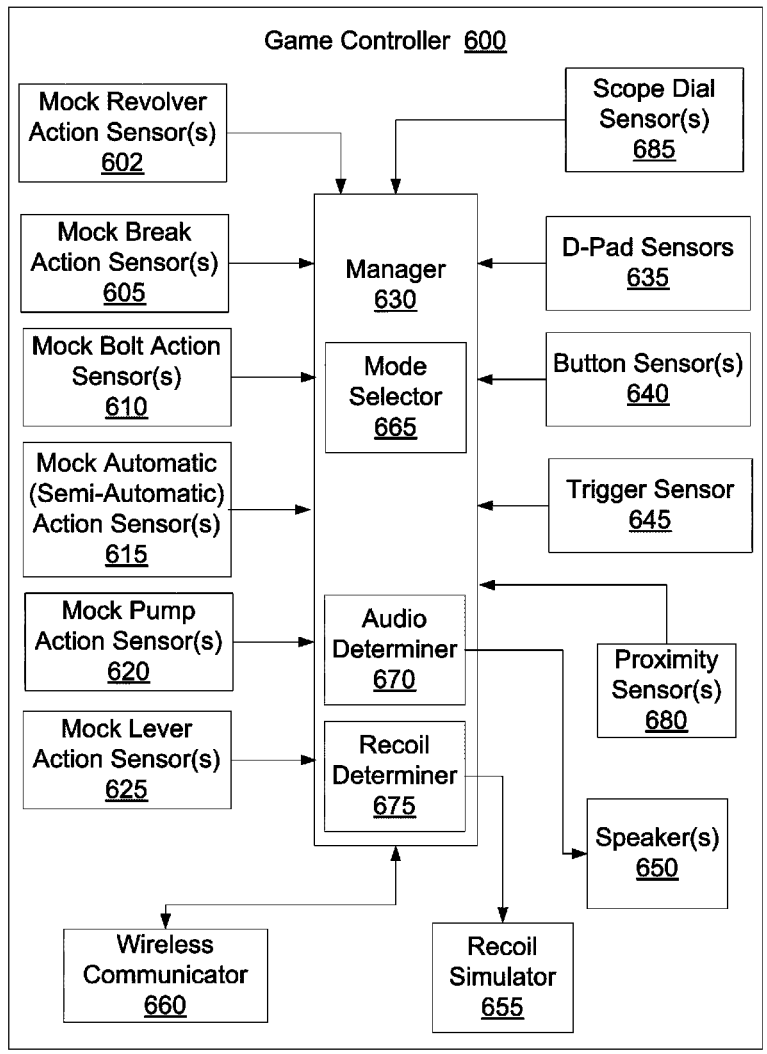
FIG. 6 illustrates a block diagram of a game controller, in accordance with one embodiment of the present invention.

FIG. 6 illustrates a block diagram of internal components of a game controller 600, in accordance with one embodiment of the present invention. In one embodiment, game controller 600 is a firearm controller (such as firearm controller 100, 200, 250, 300, 400, 500 or 570).

Game controller 600 includes multiple mock firearm action sensors 602-625, where each mock firearm action sensor is used to identify when a user manipulates/operates a specific mock firearm action included in the game controller 600. In one embodiment, game controller includes one or more mock revolver action sensors 602 for detecting operation of a mock revolver action, one or more mock break action sensors 605 for detecting operation of a mock break action, one or more mock bolt action sensors 610 for detecting operation of a mock bolt action, one or more mock automatic/semi-automatic action sensors 615 for detecting operation of a mock automatic action, one or more mock pump action sensors 620 for detecting operation of a mock pump action and one or more mock lever action sensors 625 for detecting operation of a mock lever action. Alternatively, game controller 600 may include mock action sensors for greater or fewer mock firearm actions.

Game controller 600 may also include a trigger sensor (or switch) for detecting when a trigger is pulled. Additionally, game controller 600 may include multiple scope dial sensors 685 for detecting adjustments to a scope attachment. In one embodiment, the scope dial sensors 685 are included in the scope attachment, and are connected to the game controller when the scope is attached to the game controller 600. Game controller 600 also includes one or more button sensors 640 for detecting when associated buttons are pressed and D-pad sensors 635 for detecting when portions of a D-pad are pressed.

In one embodiment, each of the mock firearm sensors 602-625, scope dial sensors 685, D-pad sensors 635, button sensors 640 and trigger sensors 645 are connected to a manager 630. The manager 630 receives inputs from the connected sensors, and forwards the inputs to a wireless communicator 660 and/or generates signals based on the inputs, and sends those signals to the wireless communicator 660. The wireless communicator 660 then wirelessly transmits the signals or inputs to a computing device. Note that wireless communicator 660 may instead be a wired communicator, in which case signals/inputs would be transmitted via a wired connection to the computing device. Examples of wired connections include connections made via an IEEE 1394 (firewire) cable, an ethernet cable, and a universal serial bus (USB) cable, etc. Examples of wireless connections include wireless fidelity (WiFi™) connections, Bluetooth® connections, Zigbee® connections, and so on.

In one embodiment, the manager 630 includes a mode selector 665. The mode selector 665 may include multiple different weapon modes. In one embodiment, mode selector includes a different weapon mode for each of the mock firearm action sensors. For example, the mode selector 665 may include a revolver action mode, a break action mode, a pump action mode, and so on. The mode selector 665 may also include weapon modes that are associated with multiple mock firearm action sensors. For example, the mode selector 665 may include a mode associated with the mock pump action sensors 620 and mock automatic action sensors 615. Additionally, the mode selector 665 may include multiple weapon modes that are associated with the same mock firearm action sensors. For example, mode selector 655 may include a semi-machinegun mode that is associated with the mock automatic action sensors 615 and an assault rifle mode that is also associated with the mock automatic action sensors 615.

Mode selector 665 activates and deactivates weapon modes based on input received from a computing device (e.g., via wireless communicator 660) and/or input received from a user (e.g., via D-pad sensors 635 or button sensors 645). If a weapon mode is selected based on input received from a user, the mode selector may generate an equip weapon signal, which manager 630 may send to the computing device. When a weapon mode is active, the mock firearm action sensors (and thus the corresponding mock firearm action) associated with that weapon mode are enabled. Therefore, when the game controller 600 is in, for example, pump shotgun mode, the mock pump action sensors 620 may be enabled and all other mock firearm action sensors may be disabled. Thus, when a pump shotgun is equipped in a game, the user may reload the pump shotgun in the game by operating the mock pump action. This increases a level of realism and user interaction with a shooting game. In one embodiment, mock firearm actions not associated with an active weapon mode are locked. For example, when a break action weapon mode is active, the mock lever action, mock pump action, etc. may be locked. Thus, the user may be able to operate/manipulate only enabled mock firearm actions.

In one embodiment, game controller 600 includes one or more speakers 650 connected to manager 630. Each weapon mode may have a collection of weapon sounds, each of which may be associated with a particular weapon action and/or sensor. When a weapon mode is activated, the weapon sounds associated with that weapon mode may be enabled. For example, in the pump shotgun mode example, there may be a weapon firing sound that is associated with the trigger sensor 645 and/or with firing the weapon, and a pump operation sound that is associated with mock pump action sensors 620 and/or reloading the weapon. Therefore, when the game controller 600 is in the pump shotgun mode, pulling the trigger may cause the speakers 650 to emit the weapon firing sound of the pump shotgun (when the pump shotgun still has available ammunition in the game) and working the mock pump action may cause the speakers 650 to emit the pump operation sound. In one embodiment, manager 630 includes an audio determiner 670 that determines which sound signals to send to the speakers 650 based on the current weapon mode and current weapon function/command.

In one embodiment, game controller 600 includes a recoil simulator 655 that generates a force feedback when a user fires a weapon in a game. The recoil simulator may be capable of generating varying strengths of force feedback. In one embodiment, manager 630 includes a recoil determiner 675 that determines what level of force feedback to generate. Each of the above discussed weapon modes may include a force feedback strength associated with them. Therefore, in one embodiment, recoil determiner 675 determines what strength of force feedback to use based on the current weapon mode. This increases a level of realism by generating stronger force feedback for more powerful weapons (e.g., assault rifles) and generating a weaker force feedback for less powerful weapons (e.g., handguns).

A weapon mode may include multiple different force feedback patterns. Each force feedback pattern may designate a how to generate the force feedback. For example, a weapon mode may include a first force feedback pattern for a single shot, a second force feedback pattern for a three shot burst, and a third force feedback pattern for fully automatic fire. The first force feedback pattern may cause a single kick/thrust, the second force feedback mode may cause three kicks/thrusts in rapid succession, and the third force feedback mode may cause continuous kicks/thrusts so long as the trigger is depressed. If a user fires a single shot in a game, the first force feedback pattern for the single shot may be used, and if the user fires continuous rounds of automatic fire, the third force feedback pattern may be used.

In one embodiment, game controller 600 includes one or more proximity sensors 680, as discussed above with reference to FIG. 3. When the proximity sensors 680 detect the presence of, for example, a user's head or cheek, they send signals to the manager 630 indicating the detected presence. If a current weapon mode includes a scope/zoom function, the manager 630 may send a zoom command to the computing device via the wireless communicator 660. Alternatively, the manager 630 may send the zoom command to the computing device regardless of the current weapon mode, and the computing device may determine whether to act on the zoom command.

Figure 7:
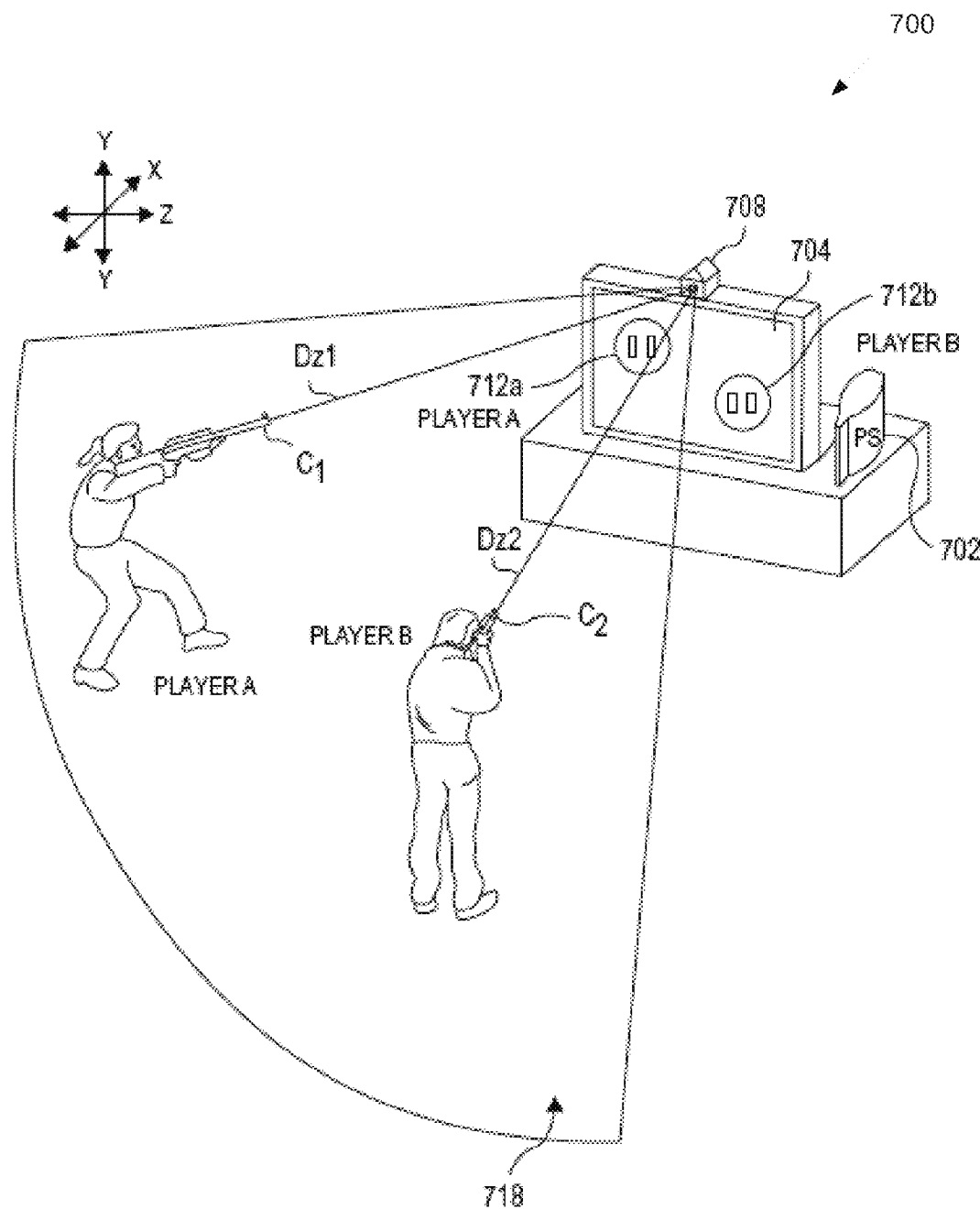
FIG. 7 shows a schematic diagram of a multiplayer environment, in which visual information is used to determine the locations of different firearm controllers held by players, according to one embodiment.

FIG. 7 shows a diagram of a multiplayer environment 700, in which visual information is used to determine the locations of different firearm controllers $C_1$ and $C_2$ held by players, according to one embodiment. In FIG. 7, each firearm controller $C_1$ and $C_2$ is connected to a computing device 702 through a wireless connection. Additionally, an optical sensor 708 is connected with computing device 702 through a wired or wireless connection. Computing device 702 may be a video game console, a personal computer, a game kiosk, or other computing apparatus. Computing device 702 may execute games or other applications that can respond to user input from the firearm controllers.

In the multiplayer environment 700, optical sensor 708 obtains an image of a playing field 718, and the image is analyzed to obtain the location of firearm controllers $C_1$, $C_2$ (which may be ball-attached controllers). Distances $d_{z1}$, $d_{z2}$ may be estimated by analyzing the shape and size of the respective balls (attached to the firearm controllers) in the captured image. Inertial sensors included in the firearm controllers $C_1$, $C_2$ are used to identify orientation and/or bearing of the firearm controllers. The computing device 702 uses the obtained coordinates, distances, orientations and/or bearings to produce representations of player A and player B in screen 704, those representations being avatars 712a and 712b, respectively.

Figure 8:
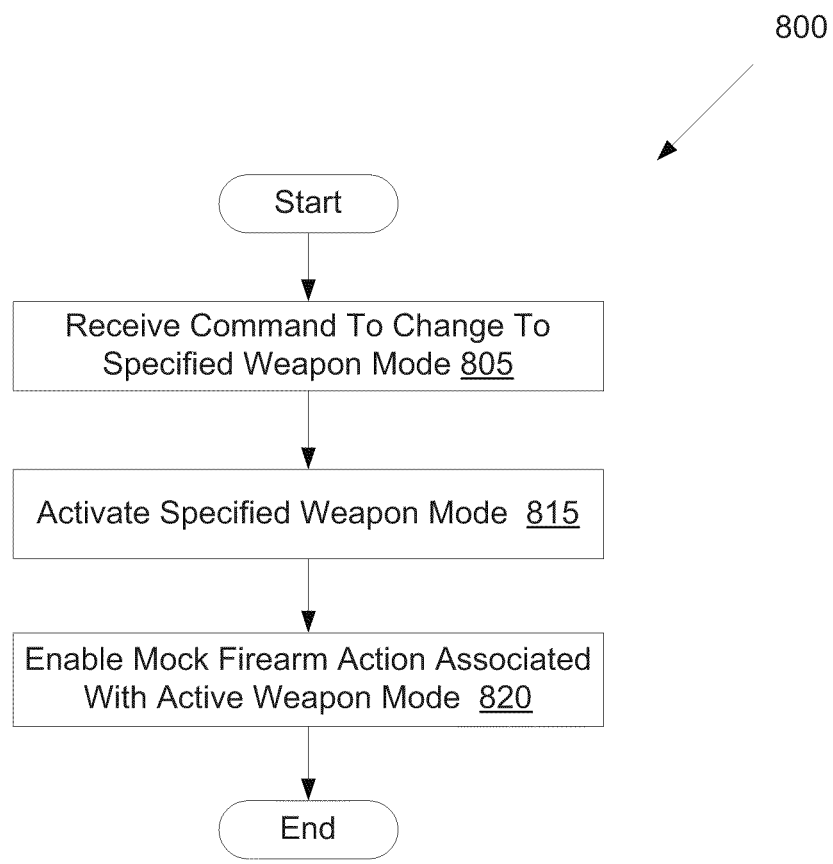
FIG. 8 illustrates a flow diagram of one embodiment for a method of activating a weapon mode for a firearm controller.

FIG. 8 illustrates a flow diagram of one embodiment for a method 800 of activating a weapon mode for a firearm controller. The method may be performed by processing logic that may comprise hardware (e.g., circuitry, dedicated logic, programmable logic, microcode, etc.), software (such as instructions run on a processing device), or a combination thereof. In one embodiment, method 800 is performed by firearm controller 600 of FIG. 6.

Referring to FIG. 8, at block 805 the firearm controller receives a command to change to a specified weapon mode. The firearm controller may include multiple weapon modes, as discussed above with reference to FIG. 6. Each of these weapon modes may have associated mock firearm actions, associated weapon sounds, associated force feedback patterns/strengths, associated zoom/scope settings, etc. In one embodiment, the firearm controller receives the command to change to the specified weapon mode from a computing device. For example, a user may equip a new weapon in a game running on the computing device, which may cause the computing device to send the command for activating (switching to) the specified weapon mode to the firearm controller. In another embodiment, the command is received via a user input (e.g., button or D-pad) on the firearm controller (e.g., a user may cycle through weapon modes by pressing a button on the firearm controller).

At block 815, the firearm controller activates the specified weapon mode. At block 820, the firearm controller enables a mock firearm action (or actions) associated with the active weapon mode. The method then ends.

Figure 9:
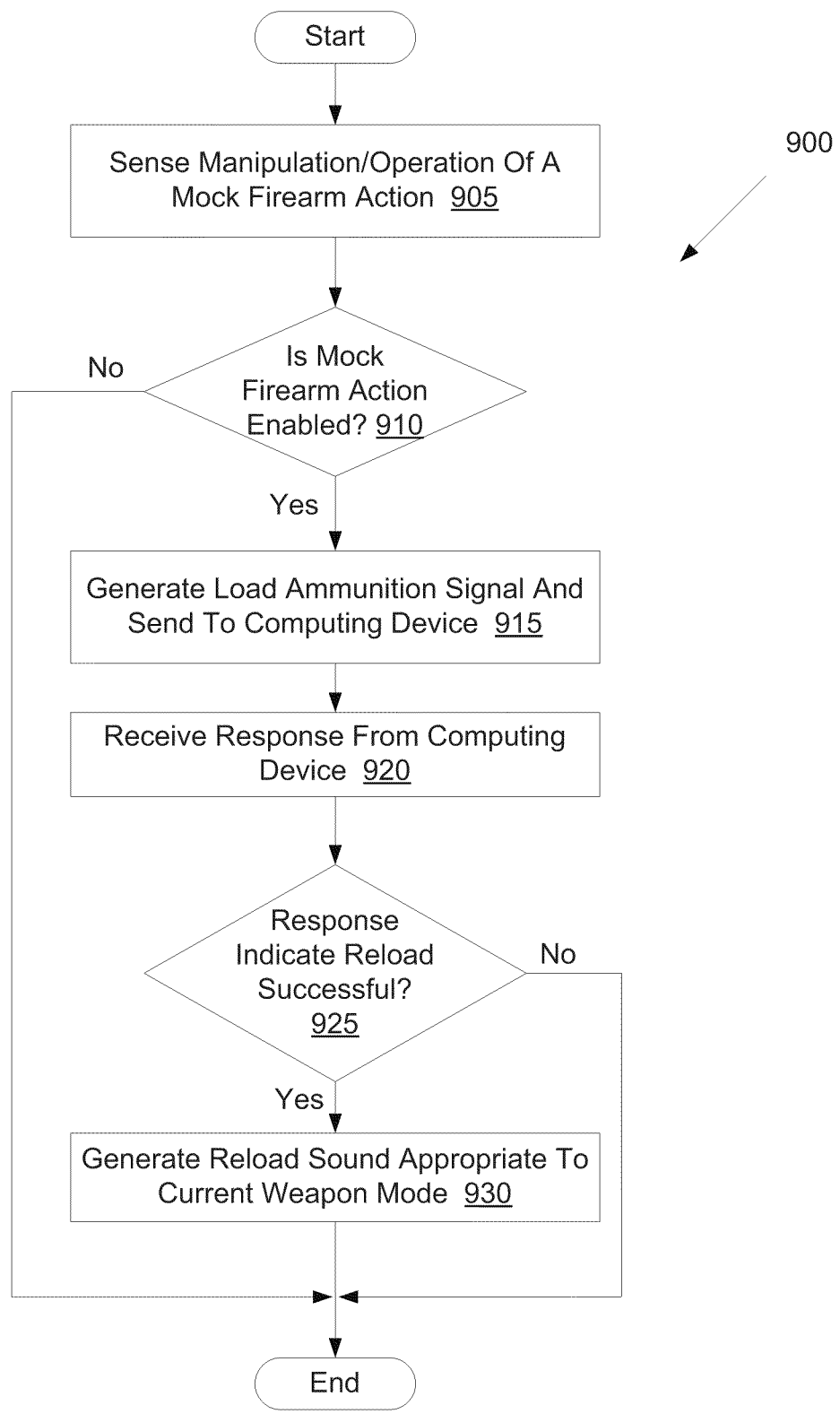
FIG. 9 illustrates a flow diagram of one embodiment for causing a game to load ammunition based on a user manipulation of a mock firearm action.

FIG. 9 illustrates a flow diagram of one embodiment for a method 900 of causing a game to load ammunition based on a user manipulation of a mock firearm action. The method may be performed by processing logic that may comprise hardware (e.g., circuitry, dedicated logic, programmable logic, microcode, etc.), software (such as instructions run on a processing device), or a combination thereof. In one embodiment, method 900 is performed by firearm controller 600 of FIG. 6.

Referring to FIG. 9, at block 905 the firearm controller senses a manipulation/operation of a mock firearm action. The manipulation of the mock firearm action may be detected, for example, by one or more mock firearm action sensors included in the firearm controller.

At block 910, the firearm controller determines whether the mock firearm action is enabled. If the mock firearm action is not enabled (e.g., if the firearm controller is not in a weapon mode associated with the mock firearm action), the method ends. If the mock firearm action is enabled (e.g., the firearm controller is in a weapon mode associated with the mock firearm action), the method continues to block 915.

At block 915, the firearm controller generates a load ammunition signal, and sends this signal to a computing device (e.g., to a game console). The load ammunition signal may cause a character to reload his weapon in a game running on the computing device if that character has sufficient ammunition. At block 920, the firearm controller receives a response from the computing device. At block 925, if the response indicated a successful reload (e.g., if the character had sufficient ammunition to reload), the method proceeds to block 930 and the firearm controller generates a reload sound appropriate to the current weapon mode. Otherwise, the method ends.

Figure 10:
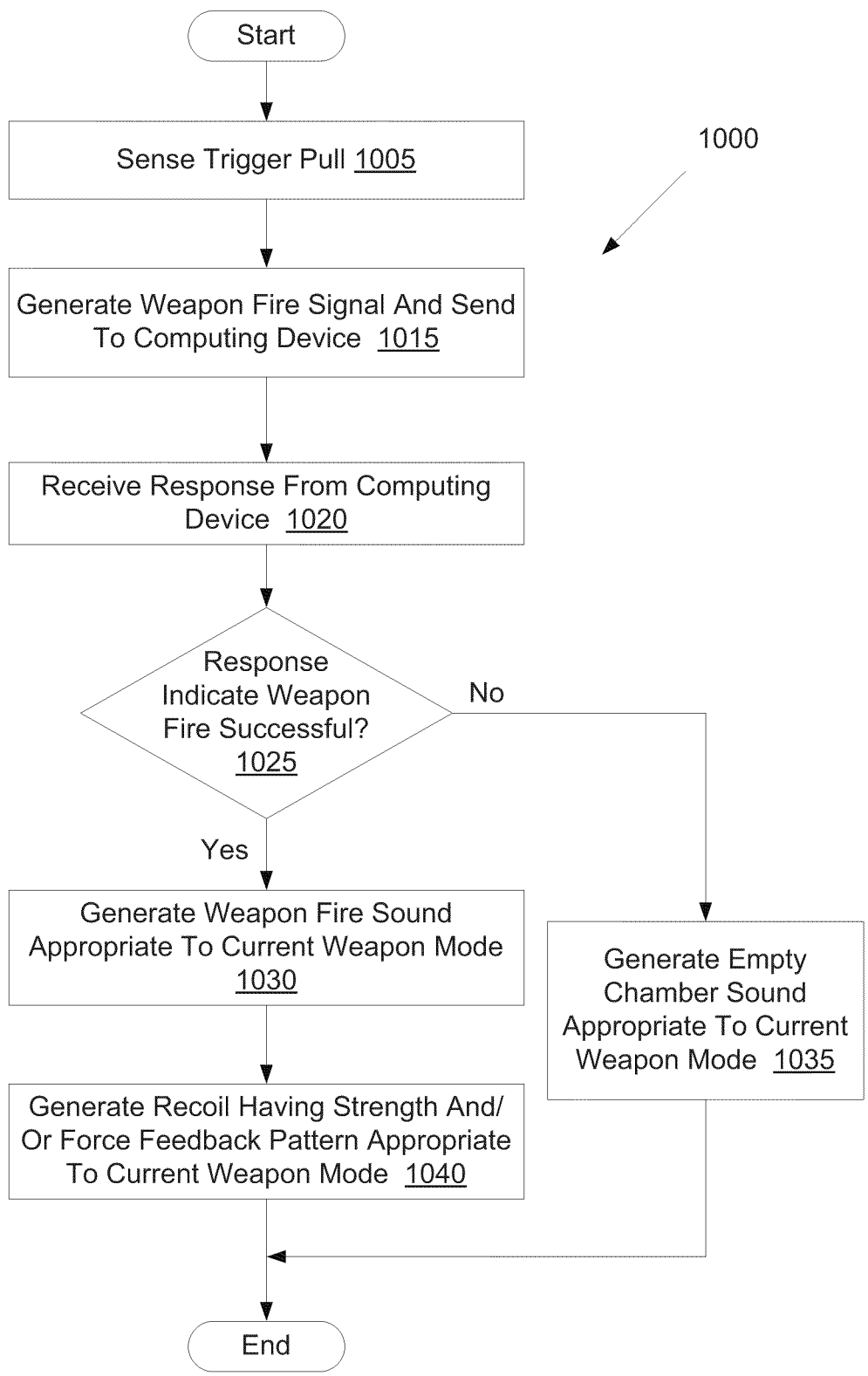
FIG. 10 illustrates a flow diagram of one embodiment for responding to a trigger pull of a firearm controller.

FIG. 10 illustrates a flow diagram of one embodiment for a method 1000 of responding to a trigger pull of a firearm controller. The method may be performed by processing logic that may comprise hardware (e.g., circuitry, dedicated logic, programmable logic, microcode, etc.), software (such as instructions run on a processing device), or a combination thereof. In one embodiment, method 1000 is performed by firearm controller 600 of FIG. 6.

Referring to FIG. 10, at block 1005 the firearm controller senses a trigger pull. At block 1015, the firearm controller generates a weapon fire signal and sends it to a computing device. A game running on the computing device may cause a character controlled by the firearm controller to fire a weapon upon receiving the weapon fire signal, provided that the character has loaded ammunition in an equipped gun in the game. At block 1020, the firearm controller receives a response from the computing device 1020 indicating whether a weapon was fired in the game.

At block 1025, if the response indicates that a weapon was fired in the game, the method continues to block 1030. Otherwise the method continues to block 1035. At block 1035, the firearm controller generates an empty chamber sound appropriate to a current weapon mode (e.g., based on a sound file associated with the current weapon mode).

At block 1030, the firearm controller generates a weapon fire sound appropriate to the current weapon mode. For example, if the current weapon mode is a Desert Eagle handgun mode, then the firing sound of a Desert Eagle handgun may be generated. At block 1040, the firearm controller generates recoil (force feedback) having a strength and/or force feedback pattern appropriate to the current weapon mode. The method then ends.

Figure 11:
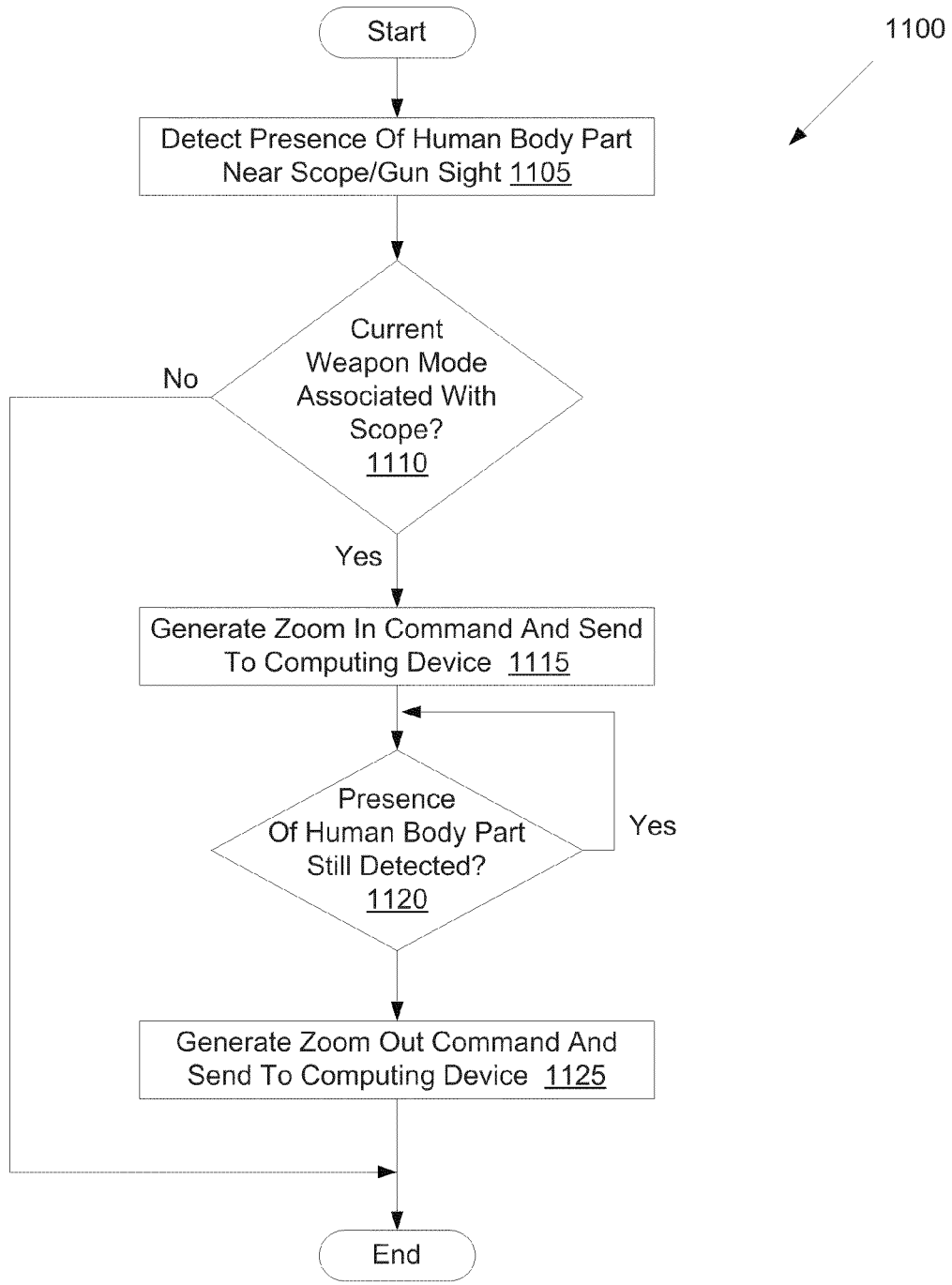
FIG. 11 illustrates a flow diagram of one embodiment for using a scope feature of a firearm controller.

FIG. 11 illustrates a flow diagram of one embodiment for a method 1100 of using a scope feature of a firearm controller. The method may be performed by processing logic that may comprise hardware (e.g., circuitry, dedicated logic, programmable logic, microcode, etc.), software (such as instructions run on a processing device), or a combination thereof. In one embodiment, method 1100 is performed by firearm controller 600 of FIG. 6.

Referring to FIG. 11, at block 1105 the firearm controller detects the presence of a human body part (e.g., a head, cheek, etc.) near a scope or gun sight. The human body part may be detected using one or more touch sensors, contact switches, proximity sensors, etc. These sensors may be disposed on the firearm controller to detect when a user holds the firearm controller close to his face, as though he were looking through a scope mounted on the firearm controller. In some cases there may actually be a scope mounted on the firearm controller that the user looks through. In other cases, there may be no scope on the firearm controller, but an equipped weapon in a current game may have a scope.

At block 1110, the firearm controller determines whether a current weapon mode activated on the firearm controller is associated with a scope/zoom function. If the current weapon mode is not associated with a scope, the method ends. If the current weapon mode is associated with a scope, the method continues to block 115. At block 115, the firearm controller generates a zoom in command/signal and sends it to the computing device.

At block 1120, the firearm controller determines if the presence of the human body part is still detected. If the presence of the human body part is still detected, the method repeats block 1120. Once the presence of the human body part is no longer detected, the method continues to block 1125, and the firearm controller generates a zoom out command/signal and sends it to the computing device. The method then ends.

Figure 12:
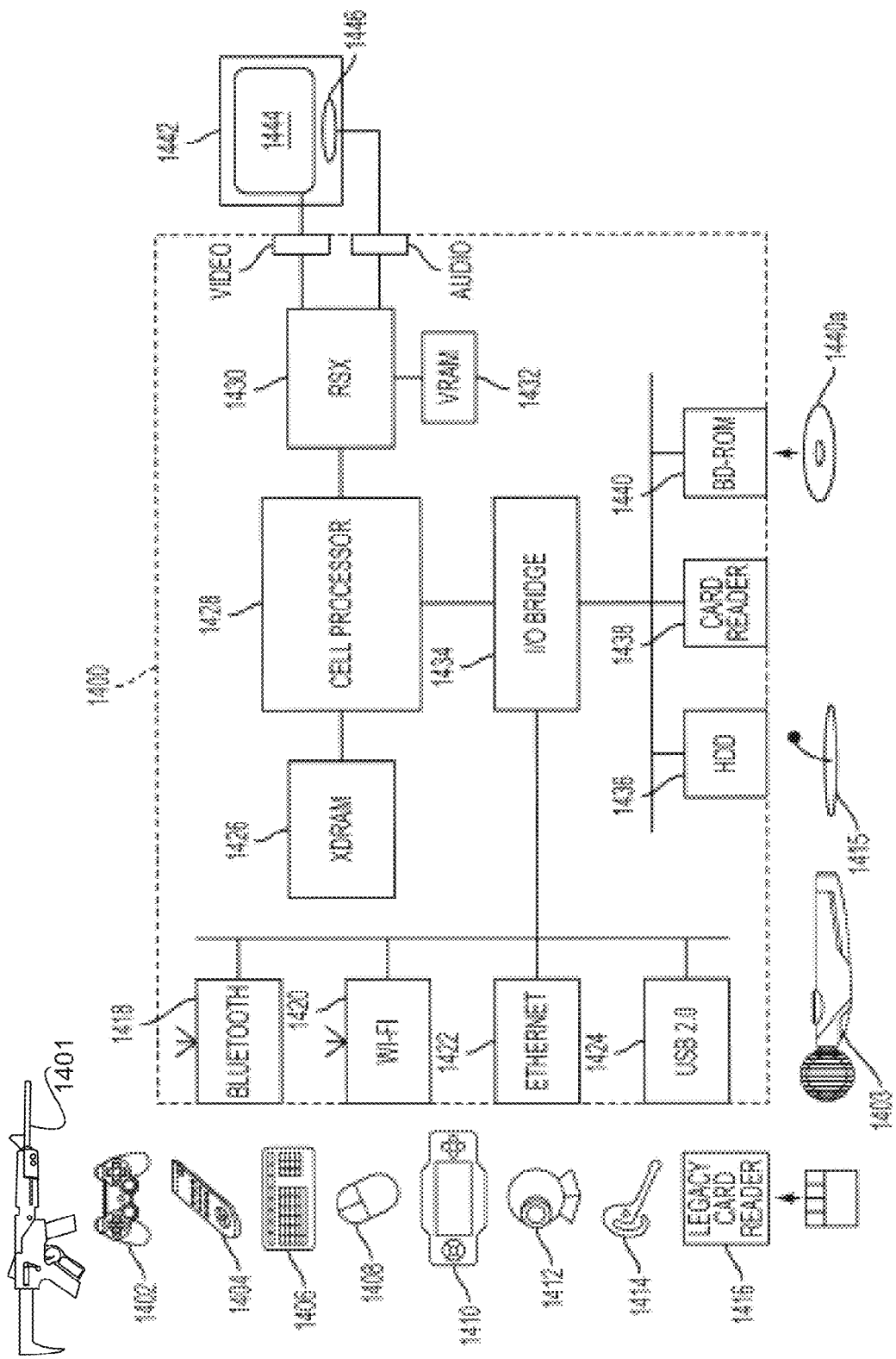
FIG. 12 illustrates hardware and user interfaces that may be used to determine controller location, in accordance with one embodiment of the present invention.

FIG. 12 illustrates hardware and user interfaces that may be used to determine controller location, interpret controller input, etc., in accordance with one embodiment of the present invention. FIG. 12 schematically illustrates the overall system architecture of the Sony® Playstation 3® entertainment device, a console that may be compatible for implementing a three-dimensional controller locating system in accordance with one embodiment of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to multiple Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1401-1403. For example when a user is playing a game, the I/O bridge 1434 receives data from the game controller 1401-1403 via a Bluetooth link and directs it to the Cell processor 1428, which updates the current state of the game accordingly.

The wireless, USB and Ethernet ports also provide connectivity for other peripheral devices in addition to game controllers 1401-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1401-1403 are operable to communicate wirelessly with the system unit 1400 via the Bluetooth link, or to be connected to a USB port, thereby also providing power by which to charge the battery of the game controllers 1401-1403. Game controllers 1401-1403 can also include memory, a processor, a memory card reader, permanent memory such as flash memory, light emitters such as LEDs or infrared lights, microphone and speaker (e.g., for ultrasound communications and/or sound effects), an acoustic chamber, a digital camera, an internal clock, a recognizable shape such as a spherical section facing the game console, inertial sensors, additional sensors (e.g., mock firearm action sensors and proximity sensors) and wireless communications using protocols such as Bluetooth®, WiFi™, etc.

Game controller 1401 is a firearm controller designed to be used with one or two hands. Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device 1410 may be used as a controller. In the case of the Playstation™ Portable device 1410, additional game or control information (for example, control instructions or number of lives) may be provided on the screen of the device. Other alternative or supplementary control devices may also be used, such as a dance mat (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones, and may also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 13:
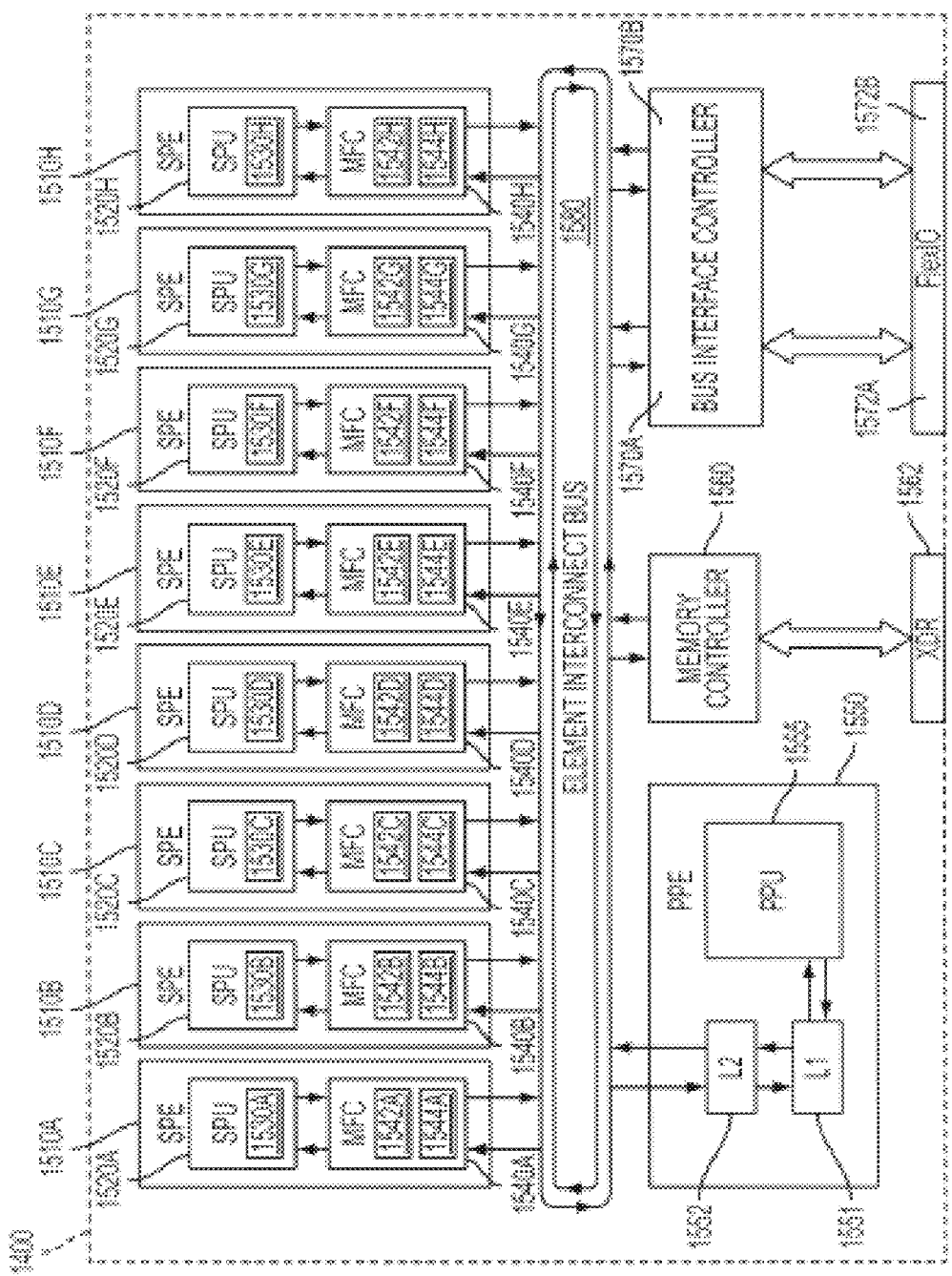
FIG. 13 illustrates additional hardware that may be used to process instructions, in accordance with one embodiment of the present invention.

FIG. 13 illustrates additional hardware that may be used to process instructions, in accordance with one embodiment of the present invention. Cell processor 1428 of FIG. 12 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Some portions of the preceding detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The present invention also relates to an apparatus for performing the operations previously described herein. This apparatus may be specially constructed for the required purposes, or it may comprise a general purpose computer selectively activated or reconfigured by a computer program stored in the computer. In one embodiment, the system for performing the operations herein includes a game console (e.g., a Sony Playstation®, a Nintendo Wii®, a Microsoft Xbox®, etc.). A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any type of media suitable for storing electronic instructions.

A machine-readable medium includes any mechanism for storing information in a form readable by a machine (e.g., a computer). For example, a machine-readable medium includes a machine readable storage medium such as a read only memory ("ROM"), random access memory ("RAM"), magnetic disk storage media, optical storage media, flash memory devices, etc.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A firearm game controller, comprising:
a plurality of manual mock firearm actions selected from a group of manual mock firearm actions consisting of a mock bolt action, a mock lever action, a mock break action, a mock pump action, and a mock revolver action, associated with a first weapon mode, to generate a load command when one of the plurality of manual mock firearm actions is operated by a user;
an automatic or semiautomatic mock firearm action, including an ammunition magazine holder having a detector for detecting the presence of a mock ammunition magazine, associated with a second weapon mode, to generate the load command when the ammunition magazine is inserted by the user into the ammunition magazine holder causing the detector to detect the presence of the mock ammunition magazine; and
a weapon mode selector to select the first weapon mode, to enable the one of the plurality of manual mock firearm actions when the one of the plurality of manual mock firearm actions is operated by the user and to select the second weapon mode, and to enable the automatic or semiautomatic mock firearm action when the presence of the mock ammunition magazine is detected in the ammunition magazine holder.

2. The game controller of claim 1, further comprising:
a trigger, to generate a fire command; and
a recoil simulator, to generate a force feedback when the fire command is generated.

3. The game controller of claim 2, wherein the recoil simulator to generate a first force feedback when the game controller is in a first weapon mode and to generate a second force feedback when the game controller is in a second weapon mode.

4. The game controller of claim 1, further comprising:
a proximity sensor, to detect the presence of an object, wherein the game controller to generate a zoom command when the presence of the object is detected by the proximity sensor.

5. The game controller of claim 1, further comprising:
a speaker, to simulate sounds made by a first weapon associated with the first weapon mode when the first weapon mode is active and to simulate sounds made by a second weapon associated with the second weapon mode when the second weapon mode is active.

6. The game controller of claim 1, wherein the weapon mode selector to receive a weapon mode signal from a game, the weapon mode signal identifying one of the first weapon mode or the second weapon mode to activate, and to activate the one of the first weapon mode or the second weapon mode identified by the weapon mode signal.

7. The game controller of claim 1, wherein the weapon mode selector to receive a user selection of the one of the first weapon mode and the second weapon mode, to activate the selected weapon mode, and to send a signal to a game console identifying the selected weapon mode.

8. The game controller of claim 1, further comprising:
an interface for receiving a motion sensitive game controller.

9. The game controller of claim 1, further comprising:
one or more inertial sensors, wherein data from the one or more inertial sensors are sent to a computing device and used to control a character in a game.

10. The game controller of claim 1, further comprising:
a controller body;
at least one of a mock scope or a mock gun sight attached to the controller body; and
a proximity sensor, disposed proximate to the mock scope or the mock gun sight, to detect the presence of a human body part, wherein the game controller to generate a zoom command when the presence of a human body part is detected by the proximity sensor.

11. The game controller of claim 10, wherein the presence of the human body part is detected by the proximity sensor when a user looks through the mock scope or the gun sight.

12. The game controller of claim 10, wherein the proximity sensor is disposed at the mock scope or the mock gun sight.

13. The game controller of claim 10, further comprising:
the weapon mode selector to enable the game controller to generate the zoom command only if the selected weapon mode includes a zoom function.

14. A method comprising:
sensing a user operating a one of a plurality of mock firearm actions by a firearm controller, the plurality of mock firearm actions comprising a plurality of manual mock firearm actions selected from a group of manual mock firearm actions consisting of: a mock bolt action, a mock lever action, a mock break action, a mock pump action, and a mock revolver action, the one of the plurality of mock firearm actions associated with a first weapon mode, and generating a load command when one of the plurality of manual mock firearm actions is operated by the user;
sensing a user operating an automatic mock firearm action or a semiautomatic mock firearm action, including detecting a presence of a mock ammunition magazine in a mock ammunition magazine holder, the automatic mock firearm action and the semiautomatic mock firearm action associated with second weapon mode, and generating a load command when the ammunition magazine is inserted by the user into the ammunition magazine holder;
selecting via a weapon mode selector the first weapon mode, to enable the one of the plurality of manual mock firearm actions when the one of the plurality of manual mock firearm actions is operated by the user and to select the second weapon mode, and to enable the automatic or semiautomatic mock firearm action when the presence of the mock ammunition magazine is detected in the ammunition magazine holder.

15. The method of claim 14, further comprising:
receiving a command to activate the one of the plurality of specified weapon modes by the firearm controller;
activating the one of the plurality of specified weapon modes by the firearm controller responsive to receiving the command to activate the one of the plurality of specified weapon modes; and
enabling the one of the plurality of mock firearm actions that is associated with the respective one of the plurality of specified weapon modes.

16. The method of claim 14, further comprising:
generating a reload sound associated with the one of the specified weapon modes.

17. The method of claim 14, further comprising:
sensing a trigger pull by the firearm controller;
generating a weapon fire signal and sending the weapon fire signal to a computing device; and generating a force feedback having a strength and a force feedback pattern associated with the one of the specified weapon modes.

18. The method of claim 14, further comprising:

detecting a presence of a human body part near at least one of a scope or gun sight included in the firearm controller;

generating a zoom command upon detecting the presence of the human body part; and sending the zoom command to a computing device.

* * * * *